United States Patent [19]
Rickenbach et al.

[11] Patent Number: 5,724,466
[45] Date of Patent: Mar. 3, 1998

[54] RUGGEDIZED BLIND MATING CONNECTOR FOR OPTICAL FIBERS

[75] Inventors: Robert Rickenbach, Thousand Oaks; Gilbert F. Perleberg, Goleta, both of Calif.

[73] Assignee: Raytheon E-Systems, Lexington, Mass.

[21] Appl. No.: 558,429

[22] Filed: Nov. 16, 1995

[51] Int. Cl.$^6$ .................................................. G02B 6/36
[52] U.S. Cl. .................................................. 385/60
[58] Field of Search ...................... 173/1, 46; 264/1.1; 385/54, 55, 60, 70, 72, 80, 85

[56] References Cited

U.S. PATENT DOCUMENTS

| | | | |
|---|---|---|---|
| 3,904,269 | 9/1975 | Lebduska et al. | 250/227 |
| 3,910,678 | 10/1975 | McCartney et al. | 385/58 |
| 3,922,064 | 11/1975 | Clark et al. | 385/54 |
| 3,963,323 | 6/1976 | Arnold | 385/62 |
| 4,087,158 | 5/1978 | Lewis et al. | 385/66 |
| 4,124,272 | 11/1978 | Henderson et al. | 385/60 |
| 4,193,665 | 3/1980 | Arnold | 385/72 |
| 4,361,380 | 11/1982 | Marazzi | 385/72 |
| 4,390,237 | 6/1983 | Marazzi | 385/80 |
| 4,406,515 | 9/1983 | Roberts | 385/72 |
| 4,484,796 | 11/1984 | Sato et al. | 385/72 |
| 4,526,438 | 7/1985 | Essert | 385/72 |
| 4,763,980 | 8/1988 | Gerber et al. | 385/85 |
| 4,815,812 | 3/1989 | Miller | 385/61 |
| 4,892,379 | 1/1990 | Takeda et al. | 385/60 |
| 4,898,446 | 2/1990 | Hinckley | 385/72 |
| 4,953,941 | 9/1990 | Takahashi | 385/72 |
| 5,062,682 | 11/1991 | Marazzi | 385/85 |
| 5,115,483 | 5/1992 | Morency et al. | 385/60 |
| 5,129,023 | 7/1992 | Anderson et al. | 385/70 |
| 5,187,768 | 2/1993 | Ott et al. | 385/140 |
| 5,239,603 | 8/1993 | Sonoda et al. | 385/70 |

FOREIGN PATENT DOCUMENTS

| | | |
|---|---|---|
| 1 262 210 | 10/1989 | Canada . |
| 0 194 325 A1 | 9/1986 | European Pat. Off. . |
| 0 362 128 A1 | 4/1990 | European Pat. Off. . |
| 0 429 398 A2 | 5/1991 | European Pat. Off. . |
| 42 03 966 A1 | 8/1992 | Germany . |

*Primary Examiner*—Akm E. Ullah
*Attorney, Agent, or Firm*—Michaelson & Wallace

[57] ABSTRACT

A connector for optical fibers comprising a plug assembly and a first ferrule mounted coaxially therein, a receptacle assembly and a second ferrule mounted coaxially therein, wherein at least one of the plug-mounted ferrule and the receptacle-mounted ferrule is biased outwardly from a fiber-entry end of the ferrule. An alignment sleeve optically connects the ferrules and maintains the optical connection during translation of one of the plug assembly and the receptacle assembly in a longitudinal direction relative to the other.

23 Claims, 2 Drawing Sheets

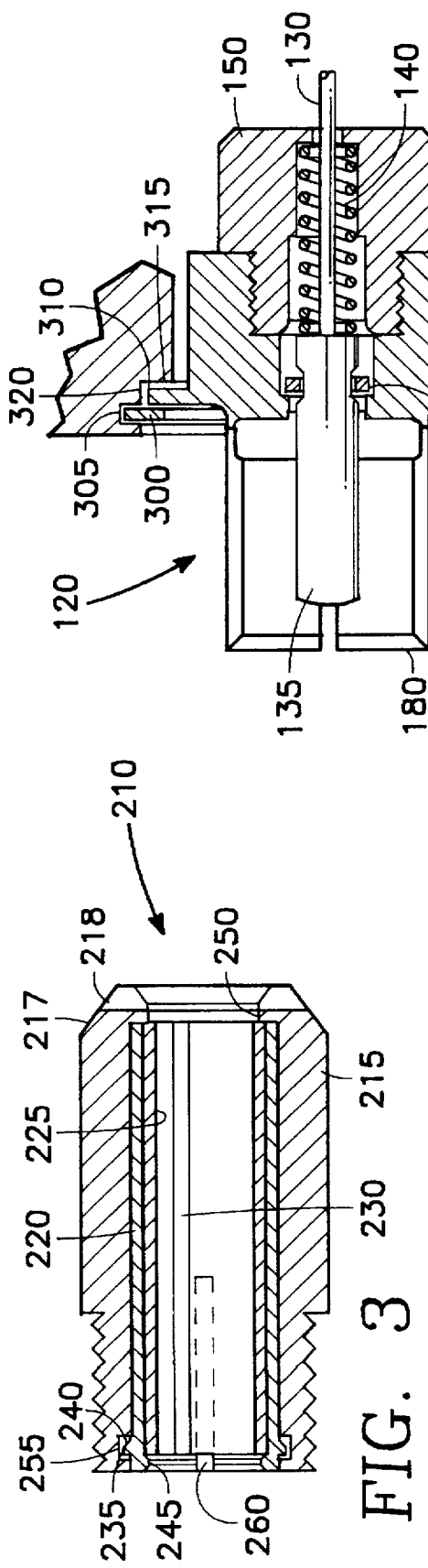
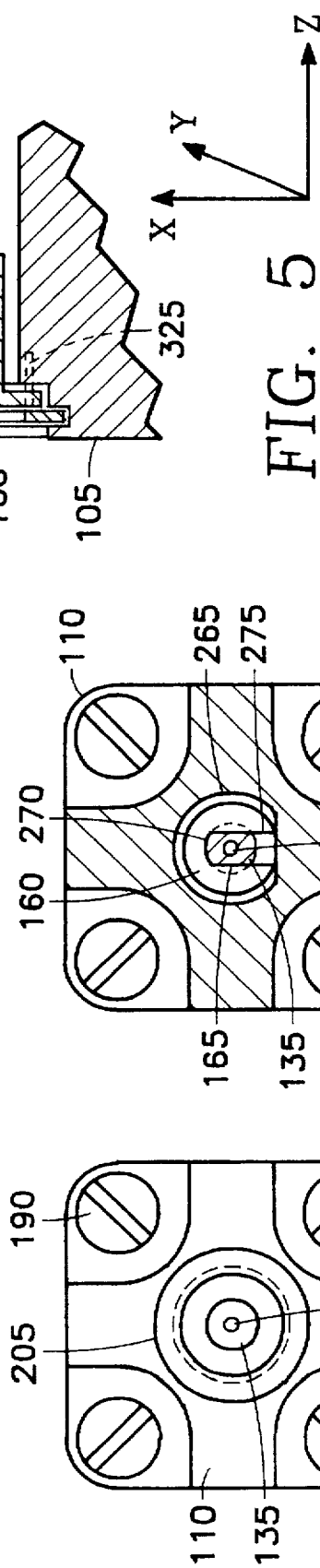
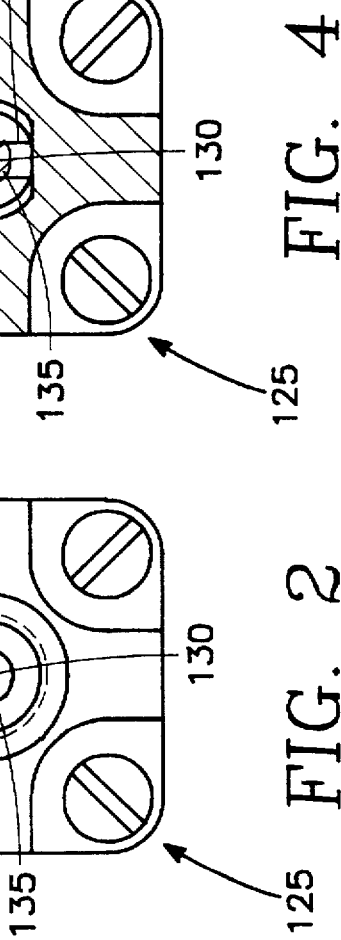
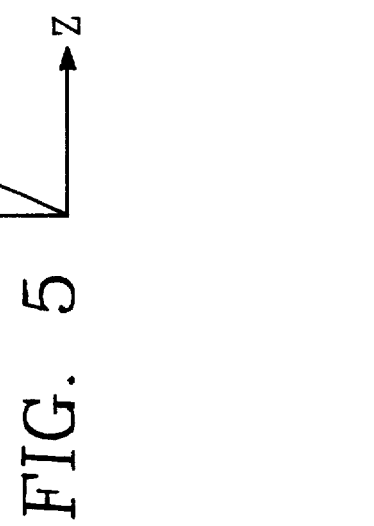

5,724,466

RUGGEDIZED BLIND MATING CONNECTOR FOR OPTICAL FIBERS

BACKGROUND OF THE INVENTION

1. Technical Field

The present invention relates to a blind mating connector for single or multimode fibers that is capable of maintaining low connection losses when exposed to severe environments, such as shock and vibration.

2. Background Art

Blind mating connectors ("BMCs") are used in applications where neither the plug nor the receptacle can be handled manually during the connection process. Such applications may include the fiber optic connections between an equipment drawer and a rack, a printed wire assembly and motherboard, or a launch platform and a missile.

Existing BMCs do not maintain satisfactory alignment of the fibers when the connectors are exposed to severe environmental conditions, such as shock or vibration, and they exhibit significant transmission losses and become intermittent. If such conditions are severe and if the BMC has resulted in fiber misalignment, an optical disconnection may occur and the fiber or connector may break.

Another problem exhibited by prior art BMCs is that they are difficult to clean because they do not provide adequate access to the ferrules for cleaning without complete disassembly. Consequently, such BMCs are typically connected or disconnected very infrequently, and usually only in a clean room environment. This significantly reduces their operational utility and increases their cost of maintenance. In addition, they are not suitable for applications where dirt or airborne contamination is present, such as aircraft or marine environments.

The glass cores of optic fibers may have a mode field diameter ("MFD") of as small as 8–9 microns for a single mode fiber or as large as 50–60 microns for a multimode fiber. Alignment of fibers in a BMC is critical to minimize losses and is more difficult with single mode fibers. Fibers with MFDs as small as 6 microns have been connected with a BMC of the present invention with low transmission losses.

SUMMARY OF THE INVENTION

A connector for optical fibers comprising a plug assembly and a first ferrule mounted coaxially therein, a receptacle assembly and a second ferrule mounted coaxially therein, wherein at least one of the plug-mounted ferrule and the receptacle-mounted ferrule is biased outwardly from a fiber-entry end of the ferrule. An alignment sleeve optically connects the ferrules and maintains the optical connection during translation of one of the plug assembly and the receptacle assembly in a longitudinal direction relative to the other.

BRIEF DESCRIPTION OF THE DRAWINGS

FIG. 2 is a cross section along section 2—2 of FIG. 1, showing a flange mounted receptacle assembly of the invention.

FIG. 3 is a cross section side view of the inline coupling of FIG. 1.

FIG. 4 is a cross section along section 4—4 of FIG. 1, showing the antirotation features of the invention.

FIG. 5 is a cross section side view of a second embodiment of the invention including an alternative plug assembly of the invention.

DETAILED DESCRIPTION OF THE PREFERRED EMBODIMENT

Figure 1:
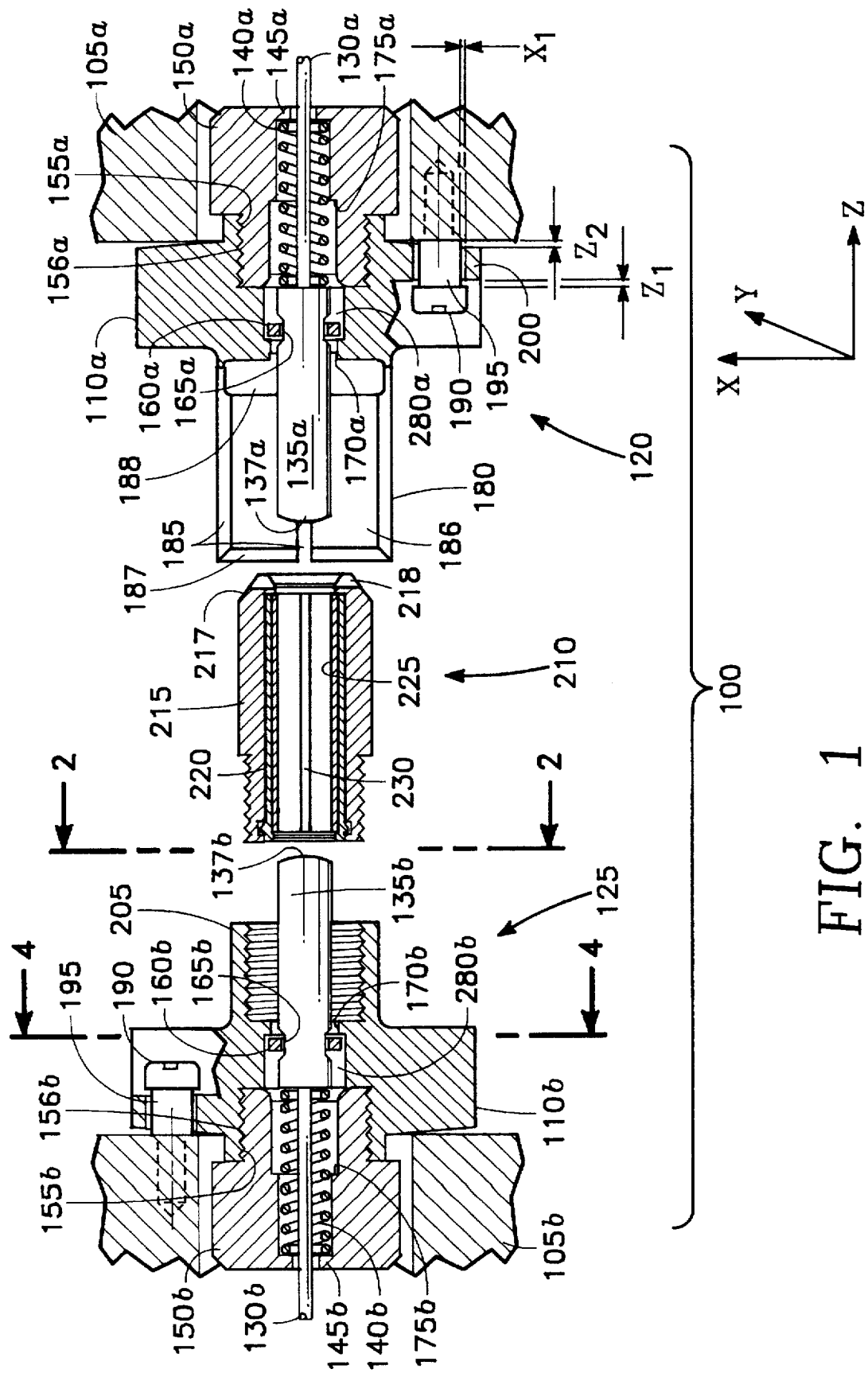
FIG. 1 is a cross section side view of a connector according to the invention.

A first embodiment of the invention is shown in FIG. 1 in which a BMC 100 is mounted on mounting surfaces 105a and 105b of a panel or chassis of the type through which fiber optic connections are made, using mounting flanges 110a and 110b. A BMC of the invention may also be mounted using other means as described subsequently in other embodiments.

BMC 100 includes a plug subassembly 120 and a receptacle assembly 125, in each of which is mounted sleeved optical fibers 130a, 130b terminated in a precision ferrules 135a, 135b having faces 137a, 137b. The fibers 130 are of a conventional design consisting of a glass core and cladding, and a buffer coating, with a typical total diameter of 250 microns, whether the fiber is single mode or multimode, which fiber is typically covered by a protective sleeve. In the plug assembly 120 and receptacle assembly 125, compression springs 140a and 140b are inserted over the fibers 130 and disposed against the end of the ferrules 135 that is adjacent the fiber 130. The other ends of springs 140 are disposed against restraining flanges 145a and 145b of tubular caps 150a and 150b, by means of which the ferrule 135 is biased outwardly from the cap 150. The cap 150 is attached to either the plug assembly 120 or the receptacle assembly 125 by conventional means, such as external threads 155a and 155b engaging internal threads 156a and 156b.

Materials selected for the flange 110 and cap 150 should be stable, and resistant to corrosion, abrasion and friction in a dynamic environment. A preferred material for this application is anodized aluminum, which has the additional advantages of low weight and cost.

Outward travel of the ferrules 135 from the flanges 110 is limited by antirotation rings 160a and 160b that are engaged about flats 165a and 165b of the ferrules 135 and disposed against retaining flanges 170a and 170b of the mounting flanges 110. This assembly allows the ferrules 135 to translate in the axially direction as the springs 140 compress and expand. The extent of such outward translation is limited by engagement of the rings 160 with the flanges 170, and such inward travel is limited by engagement of the rings 160 with restraining lips 175a and 175b of the caps 150.

The flange 110 of the plug assembly 120 is provided with an alignment barrel 180 disposed coaxially with the ferrule 135 to facilitate connection of the plug assembly 120 with the receptacle assembly 125. Slots 185 extend longitudinally along the barrel 180 forming expansion fingers 186 that expand when receiving the receptacle assembly 125. The barrel 180 is also provided with an internal tapered edge 187 to facilitate the connection process.

The mounting flange 110 and ferrule 135 can move axially and transversely (x or y direction), and rotate about the x and y axis. This is achieved by using shoulder screws 190 having a shoulder portion 195 with a length greater than the thickness of the flange 110 through which the screw is inserted. The resulting gap allows the flange 110 and cap 150 to translate along the z axis by a distance $z_1$. Further, the face of the flange 110 abutting the surface 105 is arched to provide a gap $z_2$ at the periphery of flange 110 that allows rotation about the x and y axes. Further, apertures 200 through which screws 190 are inserted have diameters exceeding the diameter of the screws by a distance $x_1$ by means of which the flange 110 and cap 150 may translate along x and y axes. This diameter clearance also facilitates rotation about the x and y axes.

The receptacle assembly 125 has many of the same features found in the plug assembly 120. A ferrule 135 is secured in a mounting flange 110 by means of a ring 160, compression spring 140 and cap 150. Flange 110 and shoulder screws 190 also have similar dimensional clearances that enable the flange to move along and rotate about the x, y, and z axes. One difference is that the mounting flange 110 of the receptacle 125 is provided with an outwardly facing collar 205 that is threaded internally to receive an inline coupling 210. An end view of receptacle assembly 125 is shown in FIG. 2.

Returning to FIG. 1, the coupling 210 is provided with means to precisely align the ferrules 135 in the plug 120 and receptacle 125. A support tube 215 is provided with external threads at one end to engage the internal threads of the collar 205 and an external tapered edge 217 at the other end to be received by the alignment barrel 180. Opposed radial tool slots 218 are formed in an end of the tube 215 terminating in the tapered edges 217. Cooperation between the external tapered edge 217 and the internal tapered edge 187 assists the location and alignment of the plug assembly 120 and the receptacle assembly 125. The external diameter of the coupling 210 is slightly larger than the internal diameter of barrel 180, so as to expand the expansion fingers 186 and bias them outwardly to clamp the coupling 210 within the barrel. The barrel 180 is also provided with an undercut 188 that distributes the clamping force of the barrel over the coupling 210 to provide a more effective securing means. The undercut 188 also provides an area in which contaminants may collect and not interfere with optical transmission.

The tube 215 is fitted with a concentric sleeve bushing 220 and a ceramic split sleeve 225, having an internal diameter slightly smaller than the external diameters of the ferrules 135. The sleeve 225 is provided with a single slot 230 that allows the sleeve to expand when ferrules 135 are inserted, which provides a spring force against the ferrules that ensures precise alignment of the fibers 130. As employed herein, "slot" means any opening having a narrow aspect ratio (i.e. in which length of the slot substantially exceeds its width) and extends along any path, including a straight line (as shown in FIG. 1), a spiral, a projection on any surface, or any other suitable path. Ceramics are preferred materials for the sleeve 225 because they are hard, nonreactive with the materials from which the ferrules 135 are typically made, and resistant to abrasion from repeated insertions and removals of the ferrules. A preferred ceramic for this application is zirconia. The sleeve 225 is inserted within the bushing 220, which has an inner diameter slightly larger than the external diameter of the sleeve 225 to allow for expansion of the sleeve after insertion of the ferrules 135. The bushing 220 limits the amount of deformation of the sleeve 225 during insertion of the ferrule 135 in order to avoid fracture of the sleeve. In addition, the bushing 220 holds and protects the sleeve 225 during insertion of the bushing into the tube 215. A strong, non-chafing metal is a preferred material for bushing 220, such as beryllium copper.

Referring to FIG. 3, components of the coupling 210 are assembled by means of several novel features. The bushing 220 is provided at one end with a radially extending flange 235 having a tapered edge 240 and an internal flange 245. The other end of the bushing 220 abuts an internal collar 250 of the tube 215. The flange 235 is adapted to be received by an internal groove 255 of the tube 215. The bushing 220 is provided with opposed longitudinal slots 260. The outer diameter of the bushing 220 is smaller than the inner diameter of tube 215 to provide for rotation about the x an y axes of the mounted bushing 220.

Assembly of the coupling 210 begins with insertion of the sleeve 225 into the end of the bushing 220 opposite the flanges 235 and 245, so that the sleeve abuts the flange 245. The bushing 220 with the sleeve 225 inserted therein is compressed radially at points orthogonal to slots the 260 in order that the flange 235 may be received by the groove 255. Insertion of the compressed bushing 220 into the tube 215 is facilitated by the tapered edge 240 allowing the bushing to move easily into tube 215. Axial movement of the bushing 220 is restrained by the flange 235 abutting the groove 255 at one end, and by the opposite end of bushing 220 abutting the collar 250. Axial movement of the sleeve 225 is restrained by one end of the sleeve abutting the flange 245 and the other end abutting the collar 250.

As shown in FIG. 4, rotation of the ferrules 135 in the flanges 110 is prevented by the novel interaction of the antirotation ring 160 with a D-shaped hole 265 provided inside the flange 110. The ring 160 is provided with a circular external shape with a cutout 270 having parallel sides 275 adapted to be received by flats 165 of the ferrules 135. The ring 160 is prevented from rotating more than a few degrees by the flat of the D-shaped hole 265, and the ferrules 135 are restrained in rotation by the secure fit of the ring 160 to the flats 165 of the ferrules.

This antirotation feature has several significant advantages. Initially, it prevents damage or breakage of the fiber 130 due to twisting during such operations as assembly of the ferrule 135 into the cap 150. Damage to the ferrules 135 and fibers 130 is also avoided during cleaning of the faces 137 because rotation of the ferrule 135 is minimized. In addition, this feature allows axial motion of the clamped ferrules 135 and sleeve 225 assembly ("ferrule and sleeve assembly") in order to absorb axial stresses because the ring 160 slides axially in cavities 280a and 280b (as shown in FIG. 1).

Additional embodiments of the invention concern the means by which the plug assembly 120 and receptacle assembly 125 are secured to surfaces 105. Many mounting methods are adaptable to the invention, such as a retaining or snap ring arrangement shown in FIG. 5. A retaining ring 300 is disposed using a snug fit in a surface groove 305 of the mounting surface 105 and proximal a support flange 310, which is proximal support surfaces 315 and 320. The ring 300 supports the barrel 180 with respect to the mounting surface 105. A clearance is provided between the flange 310 and the surfaces 315 and 320 to allow the cap 150 and barrel 180 assembly ("cap and barrel assembly") to translate and rotate about the x and y axes and translate along the z axis. A roll pin 325 mounted with a clearance through the flange 310 and the surface 105 is used to prevent rotation of the assembly 120 about the z axis. A similar mounting method may be employed to mount the receptacle assembly 125 with respect to the mounting surface 105.

A BMC of the invention is operated by movement of the plug assembly 120 near the receptacle assembly 125, as shown in FIG. 1. Fine alignment of the plug assembly 120 and the receptacle assembly 125 is achieved by the internal tapered edge 187 of the alignment barrel 180 sliding over the external tapered edge 217, thus guiding the axis of the barrel into alignment with the axis of the receptacle assembly. In addition, the loose fit of the flanges 110 onto the surfaces 105 assists connection by allowing movement in the x and y directions.

As the coupling 210 is being received by the barrel 180, the ferrule 135 of the plug assembly 120 is translated into the sleeve 225, expanding the sleeve and achieving a secure fit and alignment of the ferrule 135 of the coupling 210 and the ferrule 135 of the plug assembly 120. The plug assembly 120 and the receptacle assembly 125 are moved toward one another until the respective faces 137 make contact. The sleeve 225 clamps the ferrules 135 to attain precise alignment of the fibers 130 for transmission of an optical signal. Stress and vibration along the z axis is absorbed by compression of the springs 140 and translation of the ferrule and sleeve assembly along the z axis.

During the connection operation, the operator need not directly handle or observe the plug assembly 120 or the receptacle assembly 125, as long as the axes of the two assemblies are reasonably coincident. As explained previously, this is a desirable feature for a BMC. Further, a BMC of the invention does not require any manipulation of either the plug assembly 120 or receptacle assembly 125 to accomplish connection.

A BMC of the invention is able to maintain low transmission losses during exposure to severe environmental conditions, such as mechanical shock and misalignments, vibration, temperature variations, thermal shock and marine exposure. The successful operation of the BMC in such environments is due to its many novel features, including the ability to absorb the stresses and strains of such conditions while isolating and protecting the precise optical alignment of the fibers 130. Larger linear displacements (along x and y axes) and angular displacements (rotation about x and y axes) are accommodated by the loose fit of the flanges 110 on the surfaces 105, achieved by the use of shoulder screws 190, arched faces on the flanges 110, and dimensional clearance between the diameters of the screws 190 and the apertures 200. Higher frequency linear and angular displacements are accommodated by the ferrule/sleeve assembly that maintains precise alignment of the ferrules 135. During periods of larger z axis displacements, the ferrule/sleeve assembly acts as a fixed unit, "floating" between the springs 140. This design assures continuous optical connection and low transmission losses during exposure to severe environments.

In addition to its ability to maintain high optical connectivity in severe environments, a BMC of the invention has numerous other novel and advantageous features. The BMC can achieve low transmission losses with fiber optic cables with MFDs as small as 6 microns, and is also suitable for larger, multimode fibers.

A BMC of the invention is easily cleaned by means of the unique coupling 210. The coupling 210 may be unscrewed from the collar 205 thereby exposing the ferrule face 137 for cleaning by conventional means. Removal of the coupling 210 is facilitated by the radial tool slots 218 adapted for insertion of a removal tool. The slots 218 avoid creation of burrs during removal of the coupling 210, which burrs could contaminate the ferrule face 137. Removal of the coupling 210 in this manner also enables easy cleaning of the sleeve 225. Access for cleaning to the other ferrule 135, i.e., of the plug assembly 120, is made easy by the ferrule face 137 being disposed near to the entrance of the barrel 180.

The floating flanges 110 are self-aligning in the x and y direction because of the clamping action of the expansion fingers 186 against the coupling 210. The spring force exerted by the fingers 186 serves to align the axes of the flanges 110 and clamp the barrel 180 to the coupling 210.

The novel bushing 220 provides several advantages to the BMC. The bushing 220 supports the sleeve 225 without screws or other fasteners and provides for movement of the sleeve 225 in the x and y directions within the coupling 210. Further, the sleeve 225 is easily removed for cleaning or replacement by compressing the slots 160 and sliding the bushing 220 out of the tube 215. The bushing 220 also supports the sleeve 225, preventing breakage, during connection at large misalignment angles and under vibration and shock.

Another advantageous feature of a BMC of the invention is that the plug assembly 120 and receptacle assembly 125 are nonpolarized, i.e., no specific angular relationship of the plug to the receptacle is required along the z axis in order to make a connection. This feature allows any specification for angular placement of the plug and receptacle to be eliminated, resulting in a cost reduction. Further, there is no need for the use of any alignment keys or rails to control angular position of the plug and receptacle.

Although the present invention has been described with reference to preferred embodiments, workers skilled in the art will recognize that changes may be made in form and detail without departing from the spirit and scope of the invention.

What is claimed:

1. A connector for optical fibers comprising:

a plug assembly and a first ferrule having a fiber-entry end mounted coaxially therein;

a receptacle assembly and a second ferrule having a fiber-entry end mounted coaxially therein, wherein at least one of said plug-mounted ferrule and said receptacle-mounted ferrule is biased outwardly from a fiber entry-end of said ferrule; and an alignment sleeve for optically connecting said first and second ferrules and maintaining said optical connection during translation of either of said plug assembly and said receptacle assembly in a longitudinal direction relative to the other of said plug assembly and said receptacle assembly.

2. The connector of claim 1 further comprising:

a biasing assembly for constraining longitudinal motion of one of said plug assembly and said receptacle assembly with respect to the other of said plug assembly and said receptacle assembly and maintaining said optical connection.

3. The connector of claim 2 wherein said biasing assembly comprises:

a restraining flange on said one of said plug assembly and said receptacle assembly; and a biasing spring disposed between said fiber-entry end of one of said ferrules and said restraining flange.

4. The connector of claim 1 wherein said connector is proximal a mounting surface and at least one of said plug assembly and said receptacle assembly further comprises:

mounting means for constraining translation of said assembly in a longitudinal direction while the other of said plug assembly and said receptacle assembly remains stationary.

5. The connector of claim 4 wherein said mounting means comprises a flange component comprising:

means for constraining translation of said assembly in a transverse direction of said assembly while the other of said plug assembly and said receptacle assembly remains stationary; and an arcuate face abutting said mounting surface for constraining rotation of said assembly about an axis parallel to said transverse direction while the other of said plug assembly and said receptacle assembly remains stationary.

6. The connector of claim 5 wherein said means for constraining comprises:

shoulder screws having a shoulder length longer than a thickness of said flange component and a diameter smaller than apertures through which said screws are mounted.

7. The connector of claim 1 further comprising:

antirotation means for minimizing rotation of said ferrules in at least one of said plug assembly and said receptacle assembly.

8. The connector of claim 7 wherein said antirotation means comprises:

a restraining aperture in said assembly concentric with a ferrule and having a flat on a portion of a circumference of said aperture; and an antirotation ring adapted to engage flats formed on said ferrule and engage said aperture flat so as to constrain rotation of said ring and said ferrule within said aperture.

9. The connector of claim 1 further comprising:

an inline coupling for concentric mounting of said sleeve, wherein said coupling is adapted to be removably mounted on said receptacle assembly and slidably engaged with said plug assembly.

10. The connector of claim 9 wherein said inline coupling further comprises:

an internal groove formed near one end of said coupling;

a support bushing adapted to slidably receive said sleeve to constrain deformation of said sleeve, including a restraining lip provided at one end thereof adapted to be received by said internal groove and slots for deforming said bushing to engage said lip in said groove and limiting longitudinal travel of said bushing in said coupling, and an inwardly disposed restraining rim formed in said one end to limit longitudinal travel of said sleeve; and an inwardly disposed restraining flange at an end of said coupling opposite said groove for limiting longitudinal travel of said sleeve and said bushing in said coupling.

11. The connector of claim 9 wherein said plug assembly further comprises:

a barrel having slots and having an inner diameter no greater than an external diameter of said coupling, whereby said barrel is expandable to engage said coupling.

12. The connector of claim 11 wherein said barrel has a coupling-engaging end and said inline coupling has a barrel-engaging end, said connector further comprising:

an inwardly facing taper on said coupling-engaging end of said barrel; and an outwardly facing taper on said barrel-engaging end of said inline coupling, said inwardly and outwardly facing tapers being mutually engagable with one another.

13. The connector of claim 4 wherein said mounting means comprises a restraining ring assembly comprising:

a support flange on at least one of said plug assembly and said receptacle assembly;

an inwardly disposed surface groove in said mounting surface adjacent said assembly groove; and a retaining ring disposed in said surface groove and adjacent said support flange for constraining translation of said assembly in a longitudinal direction of said assembly.

14. The connector of claim 13 further comprising a roll pin disposed in said support flange and said surface for constraining rotation of said assembly.

15. The connector of claim 1 further comprising a slot in said alignment sleeve for exerting a compression force on said ferrules.

16. A connector for optical fibers, each terminating in a ferrule mounted coaxially in an adapter and having a fiber-entry end, said connector comprising:

an alignment sleeve for clamping together said ferrules in an optically transmitting position; and a biasing assembly for constraining longitudinal motion of one of said adapters with respect to the other of said adapters and maintaining said optically transmitting position during translation of either of said ferrules in a longitudinal direction relative to the other thereof.

17. The connector of claim 16 wherein said biasing assembly comprises:

a restraining flange on said one of said adapters; and a biasing spring disposed between said fiber-entry end of one of said ferrules and said restraining flange.

18. A connector for optical fibers, each terminating in a ferrule mounted coaxially in an adapter, wherein said ferrules are clamped together in an optically transmitting position by an alignment sleeve, said connector comprising:

an inline coupling concentrically mounted on said sleeve, wherein said coupling is adapted to be removably mounted on one of said adapters and slidably engaged with the other of said adapters.

19. A connector for optical fibers, each terminating in a ferrule mounted coaxially in an adapter, wherein said ferrules are clamped together in an optically transmitting position by an alignment sleeve, wherein one of said adapters is proximal a mounting surface, said connector comprising:

a translating mount connected to said one of said adapters proximal the mounting surface, said translating mount translatively attaching the adapter proximal the mounting surface to the mounting surface.

20. The connector of claim 19 wherein said translating mount comprises:

a flange for constraining translation of said one of said adapters in a longitudinal direction of said adapter; and an arcuate face abutting said mounting surface for constraining rotation of said adapter about said transverse direction.

21. The connector of claim 18 wherein said inline coupling further comprises:

an internal groove formed near one end of said coupling;

a support bushing adapted to slidably receive said sleeve for preventing deformation of said sleeve, including a restraining lip provided at one end adapted to be received by said internal groove and slots for deforming said bushing to engage said lip in said groove and limiting longitudinal travel of said bushing in said coupling, and an inwardly disposed restraining rim formed in the same end as said lip to limit longitudinal travel of said sleeve; and an inwardly disposed restraining flange at an end of said coupling opposite said groove for limiting longitudinal travel of said sleeve and said bushing in said coupling.

22. The connector of claim 18 wherein one of said adapters further comprises:

a barrel, having slots and having an inner diameter no greater than an external diameter of said coupling, whereby said barrel is expandable to engage said coupling.

23. The connector of claim 22 wherein said one of said adapters has a coupling-engaging end and said inline coupling has an barrel-engaging end, said connector further comprising:

an inwardly facing taper on said coupling-engaging end of said barrel; and an outwardly facing taper on said barrel-engaging end of said coupling, said inwardly and outwardly facing tapers being mutually engagable with one another.

* * * * *